United States Patent
Mayer

(10) Patent No.: US 7,886,195 B2
(45) Date of Patent: Feb. 8, 2011

(54) APPARATUS, SYSTEM, AND METHOD OF EFFICIENTLY UTILIZING HARDWARE RESOURCES FOR A SOFTWARE TEST

(75) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 353 days.

(21) Appl. No.: 12/115,209

(22) Filed: May 5, 2008

(65) Prior Publication Data

US 2009/0276665 A1 Nov. 5, 2009

(51) Int. Cl.
*G06F 11/00* (2006.01)
(52) U.S. Cl. .................................................. 714/38
(58) Field of Classification Search .................. 714/11, 714/30, 31, 38
See application file for complete search history.

(56) References Cited

U.S. PATENT DOCUMENTS

| | | | | |
|---|---|---|---|---|
| 6,065,078 A * | 5/2000 | Falik et al. | ................... | 710/100 |
| 6,314,530 B1* | 11/2001 | Mann | ........................... | 714/38 |
| 6,983,398 B2* | 1/2006 | Prabhu | ......................... | 714/12 |
| 7,213,168 B2* | 5/2007 | Kalan et al. | .................... | 714/11 |
| 7,421,619 B2* | 9/2008 | Al-Omari et al. | ............... | 714/30 |
| 7,447,946 B2* | 11/2008 | McHale et al. | ................ | 714/45 |
| 7,475,291 B2* | 1/2009 | Cardinell et al. | .............. | 714/45 |
| 2001/0025352 A1* | 9/2001 | Ghameshlu et al. | ........... | 714/11 |
| 2003/0061535 A1* | 3/2003 | Bickel | ........................... | 714/11 |

* cited by examiner

*Primary Examiner*—Marc Duncan
(74) *Attorney, Agent, or Firm*—Dickstein Shapiro LLP

(57) ABSTRACT

Apparatus, system and method of efficiently utilizing hardware resources for a software test in system having at least one redundant component, at least a part of which is used for the software test.

18 Claims, 2 Drawing Sheets

APPARATUS, SYSTEM, AND METHOD OF EFFICIENTLY UTILIZING HARDWARE RESOURCES FOR A SOFTWARE TEST

The invention relates to an apparatus, system and method of efficiently utilizing hardware resources for a software test in systems having at least one redundant component, in particular systems on chip for safety applications.

BACKGROUND OF THE INVENTION

For software debugging in an embedded application a trace flow is useful to determine which kind of events had taken place before a particular software problem arose. In general, a trace unit enables reconstruction of a monitored program flow. For these purposes a trace unit records trace data which is information about the running embedded application without halting its execution and stores the trace data sequentially, i.e. information about executed instructions is stored in the sequence of their execution.

A trace unit may record values of the instruction pointer (program counter) of a microprocessor and/or may record data accessed and processed, respectively, by a processor and/or the data flow on processor busses.

An instruction pointer (program counter) is a register in a computer processor which indicates where the computer is in its instruction sequence. Depending on the type of microprocessor, the instruction pointer comprises either the address of the instruction being executed or the address of the next address to be executed.

In general, the instruction pointer is automatically incremented for each instruction cycle so that instructions are normally retrieved sequentially from memory. However, certain instructions, such as branches and subroutine calls and returns, interrupt the sequence by placing a new value in the instruction pointer.

When tracing the instruction pointer, a trace unit continually receives so-called messages comprising compressed program flow information. Provided that the program flow is linear, a respective message comprises the number of executed linear program steps. If there is a branch in the program flow, the message will indicate a branch and, if required, the (relative) destination address of the branch.

Accordingly, the trace unit will receive about 2 bits of data per instruction which, depending on the clock rate of the traced processor, will amount to at least 100 MByte of trace data per second, roughly estimated.

For a trace of data accesses, compression is very limited. Thus, the trace unit will receive about 7 Bytes per access which, depending on the clock rate of the traced processor, will amount to several hundreds of MByte of trace data per second, roughly estimated.

Consequently, as the computing power and clock rate of modem processors increases more and more, also the amount of recorded trace data will further increase which involves very complex and die area consuming trace units, as, for example, a large trace buffer memory and a fast interface are required for managing this huge trace data volume.

Therefore, there exists a need for an apparatus and a method for tracing instruction pointers and/or data accesses in processor cores which allows a reduction of die area of trace units required for tracing instruction pointers and/or data accesses of processor cores and/or busses.

BRIEF SUMMARY OF THE INVENTION

In accordance with an aspect of the invention, there is provided a method of efficiently utilizing hardware resources for a software test in systems having at least one redundant component, wherein the method comprises using at least a part of the at least one redundant component for the software test.

In accordance with a further aspect of the invention, there is provided an apparatus for use in a system having at least one redundant component, the apparatus comprising means for reallocating at least a part of the redundant component to make the at least part of the redundant component available for a software test of at least a part of the system.

Further features, aspects and advantages of the present invention will become apparent from the following detailed description of the invention made with reference to the accompanying drawings.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION OF THE INVENTION

Figure 1:
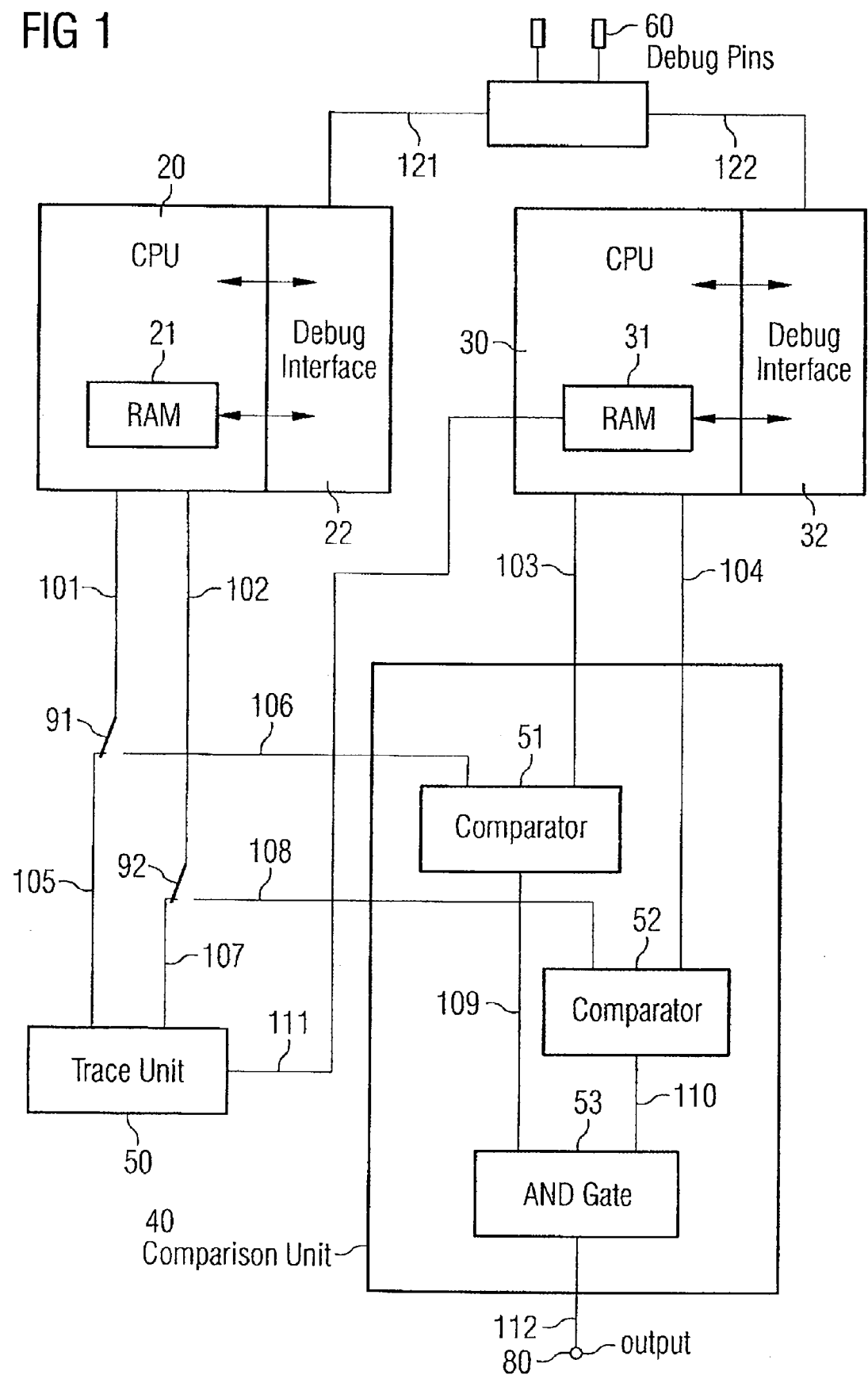
FIG. 1 shows an exemplary schematic diagram of a system according to an embodiment of the invention.

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

For software debugging in an embedded application a trace flow is useful to determine which kind of events had taken place before a particular software problem arose. In general, a trace unit enables reconstruction of a monitored program flow. For these purposes a trace unit records trace data which is information about the running embedded application without halting its execution and stores the trace data sequentially, i.e. information about executed instructions is stored in the sequence of their execution.

A trace unit may record values of the instruction pointer (program counter) of a microprocessor core and/or may record data accessed and processed, respectively, by a processor and/or the data flow on processor busses.

An instruction pointer (program counter) is a register in a computer processor core which indicates where the computer is in its instruction sequence. Depending on the type of microprocessor, the instruction pointer comprises either the address of the instruction being executed or the address of the next address to be executed.

In general, the instruction pointer is automatically incremented for each instruction cycle so that instructions are normally retrieved sequentially from memory. However, certain instructions, such as branches and subroutine calls and returns, interrupt the sequence by placing a new value in the instruction pointer.

Trigger events are generally used when carrying out traces, wherein a trigger event may be an access to a certain address or also a certain data value, for example. A trigger event may initiate a certain action, such as e.g. starting a debug monitoring or pausing operation of a processor core, or triggers may be used to control the trace flow itself.

For instance, a trigger may be used to define a trace length providing a criterion for stopping the trace or may also be used to qualify a trace which means the trace is only activated if certain prerequisites are met, such as e.g. the instruction pointer is within a certain instruction sequence of a program.

When tracing the instruction pointer, a trace unit continually receives so-called messages comprising compressed program flow information. Provided that the program flow is linear, a respective message comprises the number of executed linear program steps. If there is a branch in the program flow, the message will indicate a branch and, if required, the (relative) destination address of the branch.

Accordingly, the trace unit will receive about 2 bits of data per instruction which, depending on the clock rate of the traced processor core, will amount to at least 100 MByte of trace data per second, roughly estimated.

For a trace of data accesses, compression is very limited. Thus, the trace unit will receive about 7 Bytes per access which, depending on the clock rate of the traced processor core, will amount to several hundreds of MByte of trace data per second, roughly estimated.

The present invention provides a way to reduce the die area taken up by trace units in systems having redundant components or resources, such as e.g. safety applications.

A mainstream approach to improve reliability of systems, in particular systems on chip (SoC), for safety applications is to provide redundant or replicated hardware resources, i.e. multiple identical instances of the same system or subsystem, for example two identical processor cores.

The e.g. two identical processor cores may be operated in lock-step mode, i.e. the cores are operated in parallel, their outputs are compared, and differing outputs are interpreted as a hardware failure in which case the system is brought into a safe state.

However, the redundant hardware, e.g. processor cores, could also be provided as a failover, i.e. in case of failure of the main hardware instance (e.g. the first processor core) the system switches to the associated redundant hardware instance (e.g. the second processor core).

During a software test or debug phase it is acceptable to abandon the safety gain from the redundant instance, e.g. processor. Therefore, the "released" redundant hardware resources can be utilized for the software test.

This is particularly interesting and advantageous for memories (e.g. RAM, cache or scratch-pad) assigned to the e.g. redundant processor core as these memories can be used as on-chip trace buffers. In general, the core memories are comparatively large and have a fast interface. In particular, (redundant) processor cores comprised in lock-step systems generally comprise debug interfaces which can be used to access and read out the core memory utilized as trace buffer.

FIG. 1 shows an exemplary schematic diagram of a system according to an embodiment of the invention.

The system 10 comprises a first processor core or central processing unit (CPU) 20 (hereinafter referred to as first CPU 20), a second processor core or central processing unit (CPU) 30 (hereinafter referred to as second CPU 30), a comparison unit 40, a trace unit 50, debug interface pins 60, a first switch 91, and a second switch 92.

The first CPU 20 comprises a first memory 21 and a first debug interface 22. The second CPU 30 which is a redundant or replicate processor core/CPU comprises a second memory 31 and a second debug interface 32. The comparison unit 40 comprises a first comparator 51, a second comparator 52, and an AND gate 53.

The first CPU 20 has a first output connected to the first switch 91 via connection 101, and a second output connected to the second switch 92 via connection 102. The debug interface 22 of the first CPU 20 is connected to the debug pins 60 via connection 121.

The second CPU 30 has a first output connected to the first comparator 51 of the comparison unit 40 via connection 103 and has a second output connected to the second comparator 52 of the comparison unit 40 via connection 104, respectively. The second memory 31 of the second CPU 30 is connected to an output of the trace unit 50 via connection 111. The debug interface 32 of the second CPU 30 is connected to the debug pins 60 via connection 122.

The first switch 91 is connected to the first output of the first CPU 20, the first comparator 51, and a first input of the trace unit 50. The second switch 92 is connected to the second output of the first CPU 20, the second comparator 52 and a second input of the trace unit 50.

The trace unit 50 has its inputs connected to the switches 91 and 92 and its output to the second memory 31 of the second CPU 30.

The comparator 51 has a first input connected to the first output the first CPU 20 via connection 101, first switch 91, and connection 106, a second input connected to the first output the second CPU 30 via connection 103, and an output connected to a first input of the AND gate 53. The second comparator 52 has a first input connected to the second output of the first CPU 20 via connection 102, second switch 92, and connection 108, a second input connected to the second output of the second CPU via connection 104, and an output connected to a second input of the AND gate 53. The AND gate 53 has its first and second inputs connected to the outputs of the first and second comparators 51 and 52, respectively, and its output connected to the output 80 of the system 10.

The debug pins 60 are connected to the first debug interface 22 of the first CPU 20 via connection 121 and to the second debug interface 32 of the second CPU 30 via connection 122.

The system 10 shown in FIG. 1 is operable in two modes, a first so-called "safety mode" and a second so-called "test mode".

In the safety mode, operation of the system 10 is analog to a typical lock-step safety system. The first and second CPUs are operated in parallel, i.e. both CPUs execute the same set of operations at the same time in parallel.

In the safety mode, the switches 91 and 92 are adjusted to connect the outputs of the first CPU 20 with the comparators 51 and 52, respectively, of the comparison unit 40. Thus, the first comparator 51 may compare instruction pointer (IP) values received from the first CPU 20 with the instruction pointer (IP) values received from second CPU 30 and the second comparator 52 may compare data addresses and/or data values received from the first CPU 20 with the data addresses and/or data values received from second CPU 30. If the comparators receive equal input values they may output a logic "true" (e.g. "1") and they may output a logic "false" (e.g. "0") if the values received at their inputs are unequal. Then, the logic outputs of the comparators 51 and 52 are input in the AND gate 53 which will only output a logic "true" if both inputs are "true". Otherwise, the AND gate will output a logic "false". In the latter case a hardware failure is detected as the first CPU 20 and the second CPU 30 do not output the same result though they should actually have executed the same operation. Having detected a failure as described above, the system goes into a hardware fault handling mode.

Both CPUs comprise a debug interface which allows controlling the respective CPU and reading and writing registers and memories within the CPU. In the safety configuration, both debug interfaces will act exactly in parallel to fulfill the lock-step condition.

In the test mode, it is acceptable to abandon the safety gain from the (redundant) second CPU. Then, only the first CPU 20 operates according to its intended use executing user application operations. The hardware fault detection functionality is disabled. Thus, the hardware fault handling mode is disabled in general (as hardware faults are not detected), but may be triggered under explicit control of a hardware fault handling unit (not shown in FIG. 1).

In the test mode, the first switch 91 is adjusted to connect the first output of the first CPU 20 with the first input of the trace unit 50 and the second switch 92 is adjusted to connect the second output of the first CPU 20 with the second input of the trace unit 50. The trace unit 50 may receive instruction pointer (IP) values from the first CPU 20 at its first input and data addresses and/or data values from the first CPU 20 at its second input.

For tracing the data flow of the first CPU, trigger events may be used, i.e. the trace unit 50 starts recording the instruction pointer values and data addresses and/or data values when a particular (trigger) event occurs.

The trace unit 50 converts and/or compresses recorded trace information into (compressed) trace messages and transfers the trace messages to the second memory 31 of the second CPU 30. As the (redundant) second CPU 30 is not used to detect hardware failures, the second memory 31 of the second CPU 30 can be used by the trace unit 50 as a fast on-chip trace buffer. Thus, the embodiment of the invention shown in FIG. 1 may eliminate the need for a dedicated memory for buffering trace data.

The content of the second memory 31, in this case, trace data or rather compressed trace messages, can be read out over the debug interface 32 of the second CPU 30. For this, the debug interfaces of the first and second CPUs 20 and 30 can be operated in different individual operation modes to allow for the first and second CPU to be operated independently from each other.

A further advantage of abandoning a test of both the processor core and the replicated processor core in the lock-step mode is that debug hardware of the redundant core can be omitted, at least partially. This saves additional die area and eliminates the problem that accesses to both cores over the debug hardware need to be absolutely synchronous to allow for the two cores to be debugged in lock-step mode.

The embodiment of the invention described above may be implemented in a system on a chip (SoC). However, this implementation is optional and not mandatory.

It is to be noted that, according to the invention, other redundant hardware components (not only memories of redundant processor cores) may be used for debugging, such as e.g. redundant interfaces, register flip-flops, comparators or other logic elements of redundant processor cores.

Figure 2:
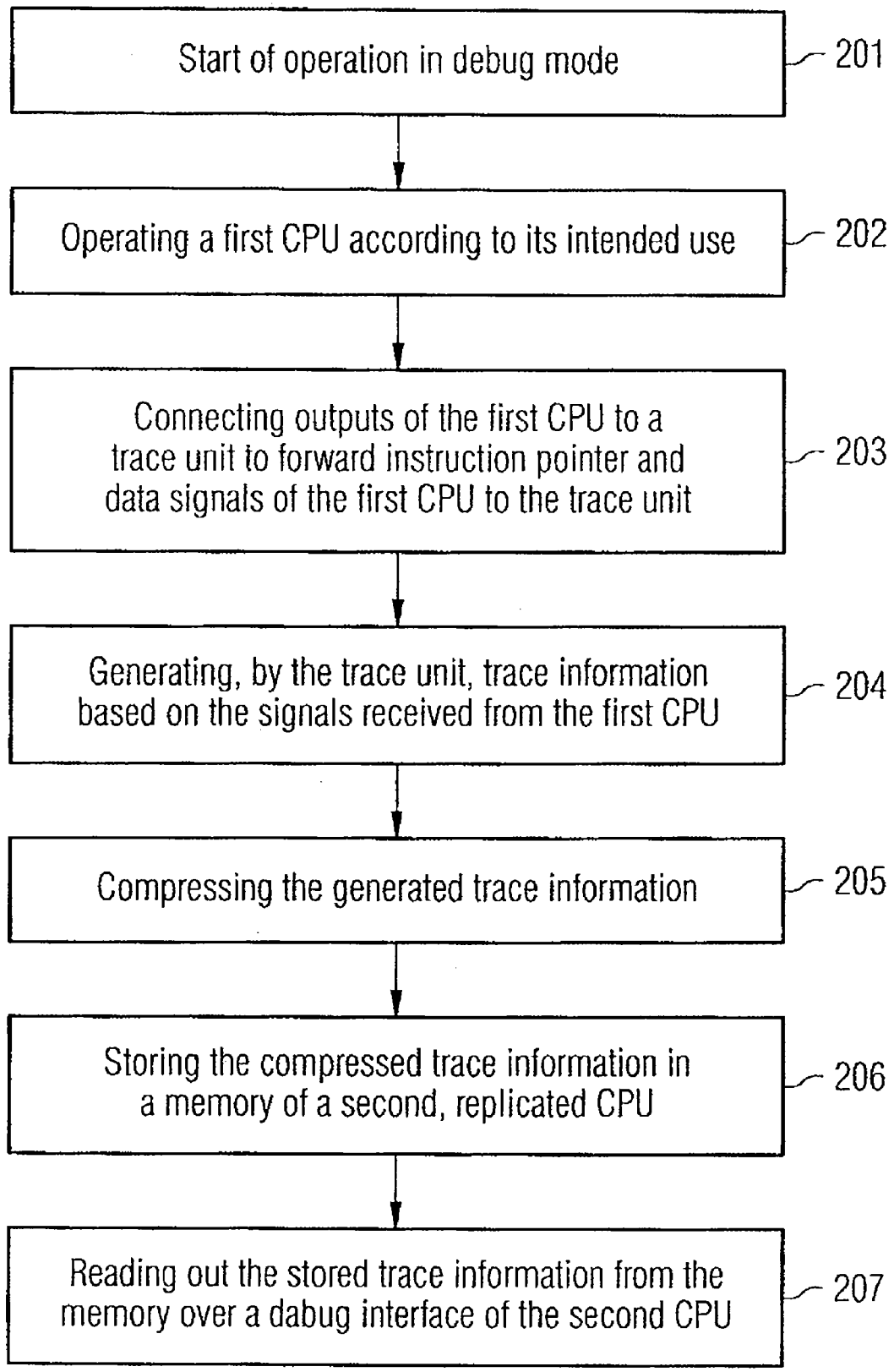
FIG. 2 shows a schematic simplified flowchart illustrating a method in accordance with a further embodiment of the invention.

FIG. 2 shows a schematic simplified flowchart illustrating a method in accordance with a further embodiment of the invention.

First, operation of the system in the debug mode is started in step 201. For this, a first CPU is operated, in step 202, according to its intended use and outputs of the first CPU are connected to a trace unit to forward instruction pointer and data signals of the first CPU to the trace unit in step 203.

In step 204, the trace unit generates trace information based on the signals received from the first CPU and compresses the generated trace information in step 205.

Then, in step 206, the compressed trace information is stored in a memory of a second, replicated CPU and eventually read out from the memory over a debug interface of the second CPU in step 207.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of efficiently utilizing hardware resources for a software test in systems having at least one replicated processor core, the method comprising:
performing the software test using at least a part of the at least one replicated processor core, wherein the part of the replicated processor core used for the software test is a memory.

2. The method of claim 1, wherein the software test is a trace of a processor core or bus comprised in the system.

3. A method for use in a system comprising a processor core, a replicated processor core, and a trace unit, the method comprising:
tracing the processor core using a memory of the replicated processor core as trace buffer for the trace unit.

4. The method of claim 3, wherein the memory of the replicated processor core is a random access memory.

5. The method of claim 4, wherein the random access memory is a cache or scratch pad memory.

6. A method for use in a system comprising a comparison unit, a trace unit, a first processor core comprising a first memory, and a second, redundant processor core comprising a second memory, the method comprising:
operating the system in a first operation mode comprising:
executing identical operations in parallel by the first and second processor cores; and
comparing outputs of the first and second processor cores by the comparison unit; and
operating the system in a second operation mode comprising:
executing operations according to its intended use by only the first processor core;
receiving an output of the first processor core, generating trace information based on the received output of the first processor core, and storing the generated trace information in the second memory of the second processor core, by the trace unit.

7. The method of claim 6, further comprising compressing the trace information before storing the generated trace information in the second memory.

8. The method of claim 6, wherein the first processor core comprises a first interface configured to control the first processor core and reading and writing registers and memories within the first processor core, and the second processor core comprises a second interface configured to control the second processor core and reading and writing registers and memories within the second processor core.

9. The method of claim 8, further comprising reading out a content of the second memory over the second interface of the second processor core.

10. An apparatus for use in a system having at least one replicated processor core, the apparatus comprising means for reallocating at least a part of the replicated processor core to make the at least part of the replicated processor core available for a software test of at least a part of the system, wherein the part of the replicated processor core used for the software test is a memory.

11. The apparatus of claim 10, wherein the software test is a trace of a processor core or bus comprised in the system.

12. The apparatus of claim 10, wherein the memory used for the software test is a random access memory (RAM).

13. The apparatus of claim 12, wherein the random access memory (RAM) is one of a cache RAM and a scratch-pad RAM.

14. The apparatus of claim 10, wherein the system is a system on chip.

15. A system comprising:
a processor core;
a redundant processor core; and
a trace unit configured to use a memory of the redundant processor core as a trace buffer for a trace of the processor core.

16. The system of claim 15, wherein the memory of the redundant processor core is a random access memory (RAM).

17. The system of claim 16, wherein the random access memory (RAM) is one of a cache RAM and a scratch-pad RAM.

18. The system of claim 15, wherein the system is a system on chip.

* * * * *